United States Patent
Xu et al.

(10) Patent No.: US 11,927,366 B2
(45) Date of Patent: Mar. 12, 2024

(54) COLD-STORAGE INSTANTANEOUS HEAT PUMP WATER HEATER

(71) Applicant: BEIJING UNIVERSITY OF CIVIL ENGINEERING AND ARCHITECTURE, Beijing (CN)

(72) Inventors: Rongji Xu, Beijing (CN); Yinshi Li, Beijing (CN)

(73) Assignee: BEIJING UNIVERSITY OF CIVIL ENGINEERING AND ARCHITECTURE, Beijing (CN)

( * ) Notice: Subject to any disclaimer, the term of this patent is extended or adjusted under 35 U.S.C. 154(b) by 360 days.

(21) Appl. No.: 16/807,718

(22) Filed: Mar. 3, 2020

(65) Prior Publication Data

US 2021/0207848 A1 Jul. 8, 2021

(30) Foreign Application Priority Data

Jan. 8, 2020 (CN) .......................... 202010016832.8

(51) Int. Cl.
*F24H 4/04* (2006.01)
*E03B 7/04* (2006.01)
*E03B 7/07* (2006.01)

(52) U.S. Cl.
CPC ............... *F24H 4/04* (2013.01); *E03B 7/045* (2013.01); *E03B 7/07* (2013.01)

(58) Field of Classification Search
None
See application file for complete search history.

(56) References Cited

U.S. PATENT DOCUMENTS

| | | | | |
|---|---|---|---|---|
| 2,575,325 | A * | 11/1951 | Ambrose | F25B 5/02 62/181 |
| 4,100,763 | A * | 7/1978 | Brody | F24D 11/0285 62/412 |
| 8,015,634 | B1 * | 9/2011 | Lessard | E03D 1/006 220/592.24 |
| 2006/0213209 | A1 * | 9/2006 | Tanaami | F24D 19/1054 62/238.6 |

(Continued)

FOREIGN PATENT DOCUMENTS

| | | |
|---|---|---|
| CN | 101012965 A | 8/2007 |
| CN | 201007556 Y | 1/2008 |

(Continued)

*Primary Examiner* — Steven B McAllister
*Assistant Examiner* — John E Bargero
(74) *Attorney, Agent, or Firm* — Samson G. Yu

(57) ABSTRACT

The present invention provides a cold-storage instantaneous heat pump water heater (HPWH). The HPWH includes a cold-water tank, a main evaporator, a compressor, and a hot water heat exchanger. In the present invention, heat of a working medium in the cold-water tank is absorbed by the main evaporator, and bathing water is rapidly heated by the hot water heat exchanger (condenser of the heat pump), thereby realizing instant heating with small input electrical power. Cold-water tank replaces the hot water tank of conventional HPWH avoiding energy loss during hot water storage. The working medium in the cold-water tank absorbs heat from the environment, to further improve energy utilization. In addition, there are three energy recovery evaporators to recover the waste heat of bathing.

10 Claims, 2 Drawing Sheets

(56) References Cited

U.S. PATENT DOCUMENTS

| | | | | |
|---|---|---|---|---|
| 2008/0247924 A1* | 4/2008 | Yui | ................................ | 422/307 |
| 2010/0230071 A1* | 9/2010 | Slater | ....................... | F24T 10/00 |
| | | | | 165/104.31 |
| 2013/0219945 A1* | 8/2013 | Koge | ......................... | F24H 4/02 |
| | | | | 62/324.6 |
| 2022/0010976 A1* | 1/2022 | Heo | ........................... | F24H 9/20 |

FOREIGN PATENT DOCUMENTS

| | | | | |
|---|---|---|---|---|
| CN | 201237300 Y | 5/2009 | | |
| CN | 102607170 A | 7/2012 | | |
| CN | 103196226 A | 7/2013 | | |
| CN | 105716329 A | 6/2016 | | |
| CN | 109899978 A | 6/2019 | | |
| JP | H0275842 A | 3/1990 | | |
| JP | 2014020735 A | 2/2014 | | |
| WO | WO-2008018698 A1 * | 2/2008 | ............. | F24D 17/02 |

* cited by examiner

COLD-STORAGE INSTANTANEOUS HEAT PUMP WATER HEATER

TECHNICAL FIELD

The present invention relates to the technical field of heat pump water heaters (HPWHs), and in particular, to a cold-storage instantaneous heat pump water heater.

BACKGROUND

In our daily life, we usually consume a large proportion of hot water, and hot water heating devices are gradually popularized. Currently, electric water heaters, solar water heaters, gas water heaters, and HPWHs are commonly used. The electric water heaters are classified into a thermal-storage electric water heater (including a hot water tank) and a tankless electric water heater. The heating device generates heat when being powered on to heat water, and a temperature sensor is used to control starting and stopping of the heating, thereby adjusting and controlling a water temperature. The electric water heater has low costs, and is simple to mount and convenient to use. The solar water heater includes a solar collector, a water tank, and an auxiliary heating device, and mainly provides hot water through solar radiation. The solar water heater is safe and clean, and has low energy consumption in operation. The gas water heater uses gas as a fuel to provide hot water through combustion. The gas water heater occupies small space and performs rapid heating. The HPWH is generally an air source HPWH, and absorbs energy from air and uses a heat pump technology to heat water in a water tank.

Hot bathing water accounts for a large proportion in the domestic hot water. During bathing, a large amount of hot water is directly discharged with heat, causing a waste of energy.

The thermal-storage electric water heater, the solar water heater, and the HPWH all require water tanks to store hot water. However, the temperature of the hot water stored in the water tank is higher than ambient temperature. Heat of the hot water in the water tank is continuously dissipated into the environment, causing a waste of energy.

In addition, each type of water heater has certain technical disadvantages. From the perspective of energy saving, energy utilization efficiency of the electric water heater is less than 1. From the perspective of safety, an electric heating device of the electric water heater directly performs heating in water, which is prone to electric leakage and electric shock. A rated heating power of the tankless electric water heater is high and is usually greater than 3 kW. As a result, an electrical load with an excessive power causes wires to heat up, resulting in a fire accident. The solar water heater has lower operating rates, and is limited during use due to complicated mounting and maintenance and greater dependence on sunlight. Especially in winter and high and cold regions, the solar water heater is prone to frost cracking, and therefore overall reliability is low. The greatest advantage of the gas water heater is instant heating. However, the gas water heater uses gas to directly heat water. Gas is a high-quality fuel, but hot water is low-quality heat. From the perspective of the second law of thermodynamics, this heating method is also a waste of energy. In addition, the gas water heater needs to be mounted in a specific position due to the need for fume extraction. The air source HPWH has high energy utilization, and a coefficient of performance (COP) can be 3 to 5. However, if an outdoor temperature is too low in winter, an outdoor unit is prone to frost, making the air source HPWH less efficient and even unable to work. How to provide a HPWH that can avoid energy loss during hot water storage and is suitable for different seasons is a problem that needs to be urgently resolved.

SUMMARY

The present invention provides a cold-storage instantaneous HPWH, so as to provide a HPWH that can avoid energy loss during hot water storage and is suitable for different seasons.

To achieve the above purpose, the present invention provides the following solution.

A cold-storage instantaneous HPWH is provided, where the HPWH includes a cold-water tank, a main evaporator, a compressor, and a hot water heat exchanger; and a condenser is arranged in the hot water heat exchanger;

a working medium is filled in the cold-water tank, the main evaporator is arranged in the cold-water tank, and an outlet of the main evaporator is connected to an inlet of the condenser through the compressor; and an outlet of the condenser is connected to an inlet of the main evaporator through an expansion valve; and a water inlet of the hot water heat exchanger is connected to a water outlet of a tap water pipe, a water outlet of the hot water heat exchanger is connected to a first water inlet of a mixing valve, a second water inlet of the mixing valve is connected to the water outlet of the tap water pipe, and a water outlet of the mixing valve is connected to a shower head.

Optionally, in a process in which the main evaporator absorbs heat in the cold-water tank, a phase change rate of the working medium in the cold-water tank is 20% to 60%.

Optionally, the cold-water tank is a toilet water tank, and a working medium in the toilet water tank is water.

Optionally, in a process in which the main evaporator absorbs heat in the toilet water tank, a phase change rate of the water in the toilet water tank is 20% to 50%.

Optionally, the HPWH further includes a thermal insulation layer, and the thermal insulation layer is coated outside the cold-water tank; and a thickness of the thermal insulation layer is a thickness corresponding to a time interval of 10-20 hours in which the working medium in the cold-water tank rises from a temperature after bathing to an ambient temperature.

Optionally, the HPWH further includes a water temperature sensor and a control system; and the water temperature sensor is arranged in a water outlet pipe of the hot water heat exchanger, the water temperature sensor is connected to an input end of the control system, an output end of the control system is connected to a control end of the compressor, and the control system is configured to adjust a rotation speed of the compressor according to a water temperature in the water outlet pipe of the hot water heat exchanger measured by the water temperature sensor.

Optionally, the HPWH further includes an auxiliary evaporator and a three-way valve;

an inlet and a first outlet of the three-way valve are serially connected to a pipe between an outlet of the expansion valve and an inlet of the compressor, and a second outlet of the three-way valve is communicated with an inlet of the auxiliary evaporator; and an outlet of the auxiliary evaporator is communicated with a pipe between the first outlet of the three-way valve and the inlet of the compressor.

Optionally, the HPWH further includes an auxiliary temperature sensor;

the auxiliary temperature sensor is arranged on an outer surface of the auxiliary evaporator, the auxiliary temperature sensor is connected to the control system, and the auxiliary temperature sensor is configured to detect an ambient temperature at a position of the auxiliary evaporator; and the control system is further configured to control a status of the three-way valve according to the ambient temperature at the position of the auxiliary evaporator.

Optionally, the auxiliary evaporator is one or more of a steam evaporator, an exhaust evaporator, and a wastewater evaporator; and the steam evaporator is disposed on a top of a bathroom, the exhaust evaporator is disposed on an air outlet of the bathroom, and the wastewater evaporator is disposed on a floor of a shower area in the bathroom.

According to specific embodiments provided in the present invention, the present invention discloses the following technical effects.

The present invention provides a cold-storage instantaneous HPWH. The HPWH includes a cold-water tank, a main evaporator, a compressor, and a hot water heat exchanger. A condenser is arranged in the hot water heat exchanger. The main evaporator is arranged in the cold-water tank, and an outlet of the main evaporator is connected to an inlet of the condenser through the compressor. An outlet of the condenser is connected to an inlet of the main evaporator through an expansion valve. A water inlet of the hot water heat exchanger is connected to a water outlet of a tap water pipe, a water outlet of the hot water heat exchanger is connected to a first water inlet of a mixing valve, a second water inlet of the mixing valve is connected to the water outlet of the tap water pipe, and a water outlet of the mixing valve is connected to a shower head. The condenser performs heat convection heat on water in the hot water heat exchanger. In the present invention, heat of a working medium in the cold-water tank is absorbed by the main evaporator, and bathing water is rapidly heated by the hot water heat exchanger through heat exchange, thereby realizing instant heating and avoiding energy loss during hot water storage of an existing HPWH. In addition, the main evaporator absorbs the heat of the working medium in the cold-water tank, so that a temperature of the working medium in the cold-water tank is lower than an ambient temperature, and the working medium in the cold-water tank can slowly absorb heat from the environment, to further improve energy utilization. Moreover, the cold-water tank is placed indoors and is not affected by the outdoor environment, and therefore is suitable for different seasons.

In the present invention, a toilet water tank is used as the cold-water tank for the following reasons. Reclaimed water used by the flush toilet every day contains a lot of low-quality heat and is cleaner than domestic sewage because there are no impurities, and utilization of the low-quality heat is simpler. In addition, a water temperature has little impact on use of the toilet, especially in summer, and toilet odor is reduced when a flushing temperature is low. Moreover, because the toilet water tank is used as the cold-water tank, the cold-water tank does not need to be separately arranged, thereby reducing a space occupied by a bathroom on the basis of reducing costs.

Furthermore, in the present invention, an auxiliary evaporator (a steam evaporator, an exhaust evaporator, or a wastewater evaporator) is further arranged to absorb waste heat generated during bathing and recover energy.

In the present invention, a thermal insulation layer is further arranged outside the cold-water tank to prevent the working medium in the cold-water tank from absorbing heat of the external environment too quickly and resulting in a rapid temperature drop of the external environment.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other accompanying drawings from these accompanying drawings without creative efforts.

REFERENCE NUMERALS

Figure 1:
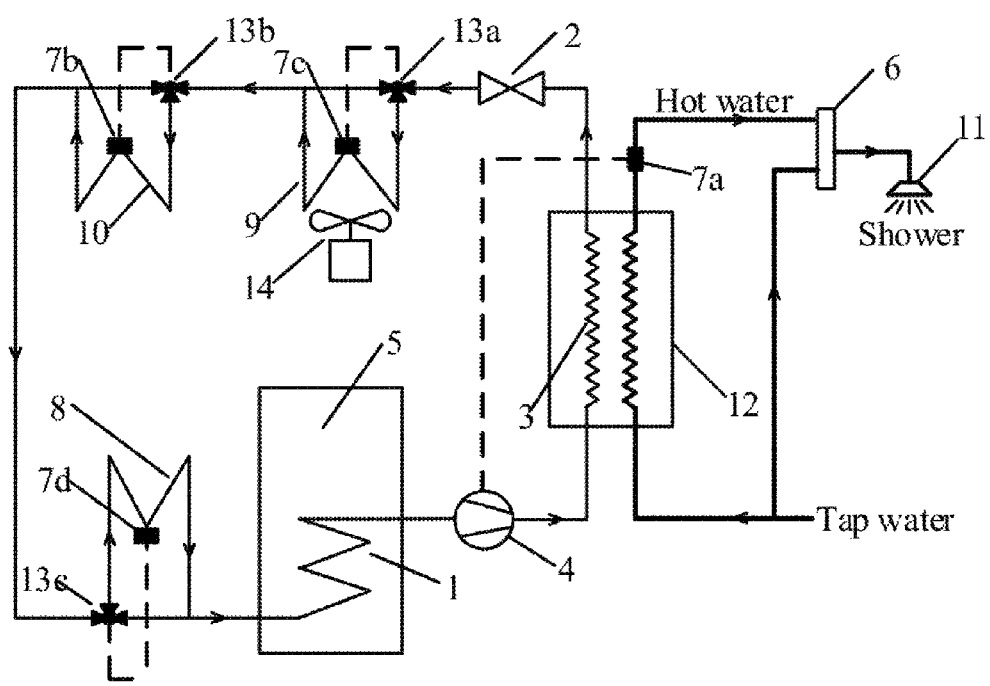
FIG. 1 is a schematic structural diagram of a cold-storage instantaneous HPWH according to the present invention.
Figure 2:
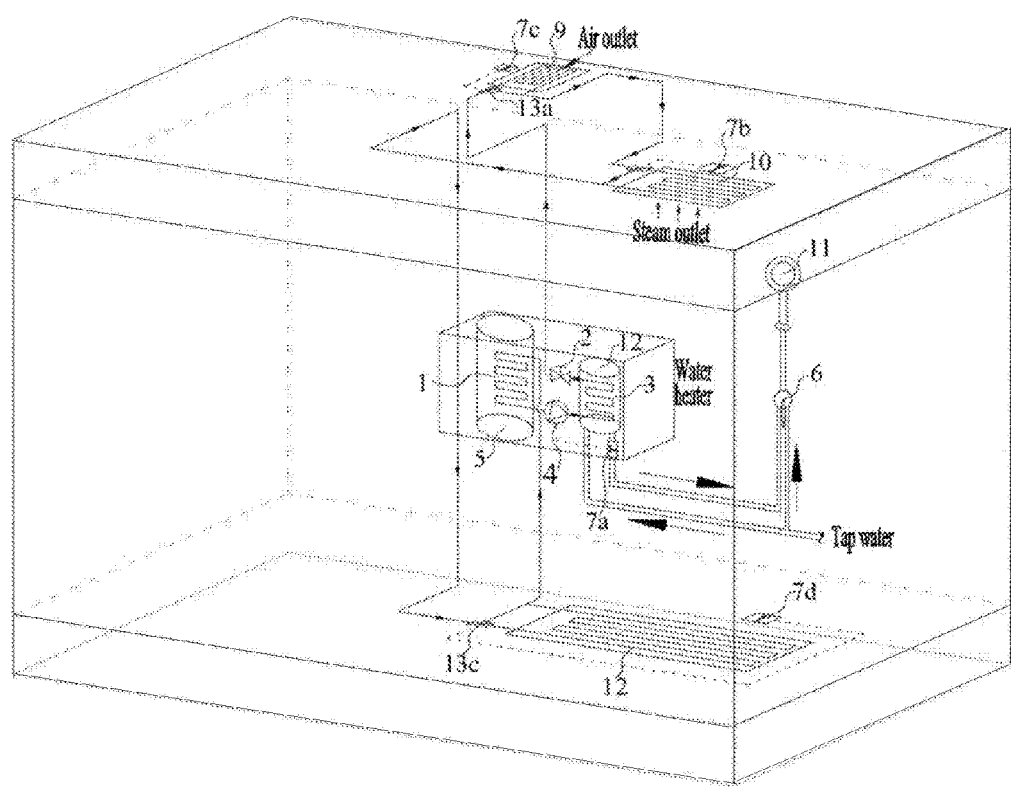
FIG. 2 is a schematic diagram of installation of a cold-storage instantaneous HPWH according to the present invention.

1. Main evaporator; 2. Expansion valve; 3. Condenser; 4. Compressor; 5. Cold-water tank; 6. Mixing valve; 7a. Water temperature sensor; 7b. Steam temperature sensor; 7c. Exhaust temperature sensor; 7d. Wastewater temperature sensor; 8. Wastewater evaporator; 9. Exhaust evaporator; 10. Steam evaporator; 11. Shower head; 12. Heat exchanger water heater; 13a. First three-way valve; 13b. Second three-way valve; 13c. Third three-way valve; 14. Exhaust fan.

DETAILED DESCRIPTION

The following clearly and completely describes the technical solutions in the embodiments of the present invention with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The present invention provides a cold-storage instantaneous HPWH, so as to provide a HPWH that can avoid energy loss during hot water storage and is suitable for different seasons.

In order to make the above objects, features, and advantages of the present invention more apparent, the present invention will be further described in detail in connection with the accompanying drawings and the detailed description.

To achieve the foregoing object, the present invention provides a cold-storage instantaneous HPWH. The HPWH includes a cold-water tank 5, a main evaporator 1, a compressor 4, and a hot water heat exchanger 12. A condenser 3 is arranged in the hot water heat exchanger 12. The main evaporator 1 is arranged in the cold-water tank 5, and an outlet of the main evaporator 1 is connected to an inlet of the condenser 3 through the compressor 4. An outlet of the condenser 3 is connected to an inlet of the main evaporator 1 through an expansion valve 2. A water inlet of the hot water heat exchanger 12 is connected to a water outlet of a tap water pipe, a water outlet of the hot water heat exchanger 12 is connected to a first water inlet of a mixing valve 6, a second water inlet of the mixing valve 6 is connected to the water outlet of the tap water pipe, and a water outlet of the mixing valve 6 is connected to a shower head 11. The condenser 3 performs heat convection on water in the hot water heat exchanger 12.

The main evaporator can absorb sensible heat of a temperature change and latent heat of a phase change of a working medium in the cold-water tank 5. During use, the working medium can undergo a phase change to be in a solid state after the heat is absorbed by the main evaporator. A phase change rate is less than or equal to 80%, and is preferably 30% to 60%. A capacity of the cold-water tank varies with the number of users, such as 30 L for 1-2 people, SOL for 2-3 people, 60 L for 3-4 people, 70 L for 5-6 people, and 100 L for 6-10 people. To continuously take more showers when the capacity is fixed, a heater can be arranged in the cold-water tank.

In a preferred implementation, every household needs a lot of water to flush a toilet every day. This part of water contains a lot of low-quality heat that is not used. To make full use of this part of low-quality heat, the cold-water tank in the present invention may be a toilet water tank. The toilet water tank stores reclaimed water for flushing and is connected to a pipeline network of the reclaimed water. A water temperature is always less than or equal to an ambient temperature. The main evaporator 1 can absorb sensible heat and latent heat of a phase change of the water in the toilet water tank. During use, the working medium can undergo a phase change to be in a solid state after the heat is absorbed by the main evaporator. A phase change rate is less than or equal to 60%, and is preferably 20% to 50% in the present invention. In this case, non-freezing water is still sufficient to flush the toilet. Because a liquid level of the toilet is higher, a flushing intensity increases. In this case, a capacity of the toilet water tank can be set according to a capacity of the cold-water tank. The setting method is: the capacity of the toilet water tank is set according to the number of users, such as 30 L for 1-2 people, 50 L for 2-3 people, 60 L for 3-4 people, 5-70 L for 6 people, and 100 L for 6-10 people. However, the present invention is not limited to the toilet water tank. To continuously take more showers when the capacity is fixed, a heater can be arranged in the toilet water tank.

The HPWH further includes a thermal insulation layer, and the thermal insulation layer is coated outside the cold-water tank (which may be but is not limited to the toilet water tank). A thickness of the thermal insulation layer is a thickness corresponding to a time interval of 10-20 hours in which the working medium in the cold-water tank rises from a temperature after bathing to an ambient temperature. That is, the thickness of the thermal insulation layer is determined by a heating time of the cold-water tank. After the maximum number of showers, the working medium in the cold-water tank reaches a lowest temperature, and the cold-water tank gradually rises from the lowest temperature to the ambient temperature. The heating time is 10-20 hours.

In a preferred implementation, the HPWH further includes a water temperature sensor 7a and a control system (not shown in the figure). The water temperature sensor 7a is arranged in a water outlet pipe of the hot water heat exchanger 12, the water temperature sensor 7a is connected to an input end of the control system, an output end of the control system is connected to a control end of the compressor 4, and the control system is configured to adjust a rotation speed of the compressor 4 according to a water temperature in the water outlet pipe of the hot water heat exchanger measured by the water temperature sensor 7a. That is, a rotation frequency of the compressor is determined by a leaving water temperature of hot water. If the leaving water temperature is lower than a specified value, the rotation speed is higher. If the leaving water temperature is closer to the specified value, the rotation speed is closer to a rated rotation speed.

In a preferred implementation, the HPWH further includes an auxiliary evaporator and a three-way valve. An inlet and a first outlet of the three-way valve are serially connected to a pipe between an outlet of the expansion valve and an inlet of the compressor, and a second outlet of the three-way valve is communicated with an inlet of the auxiliary evaporator. An outlet of the auxiliary evaporator is communicated with a pipeline between the first outlet of the three-way valve and the inlet of the compressor. The HPWH further includes an auxiliary temperature sensor. The auxiliary temperature sensor is arranged on an outer surface of the auxiliary evaporator, the auxiliary temperature sensor is connected to the control system, and the auxiliary temperature sensor is configured to detect an ambient temperature at a position of the auxiliary evaporator. The control system is further configured to control a status of the three-way valve according to the ambient temperature at the position of the auxiliary evaporator.

The auxiliary evaporator is one or more of a steam evaporator, an exhaust evaporator, and a wastewater evaporator. The steam evaporator is arranged on a top of a bathroom, the exhaust evaporator is arranged on an air outlet of the bathroom, and the wastewater evaporator is arranged on a floor of a shower area in the bathroom.

FIG. 1 in the present invention provides the embodiment including the steam evaporator, the exhaust evaporator, and the wastewater evaporator, but the present invention is not limited to the implementation shown in this embodiment.

As shown in FIG. 1, the steam evaporator 10 is arranged on the top of the bathroom, the exhaust evaporator 9 is arranged on the air outlet of the bathroom, and the wastewater evaporator 8 is arranged on the floor of the shower area in the bathroom. The auxiliary temperature sensor in this case is a steam temperature sensor 7b, an exhaust temperature sensor 7c, and a wastewater temperature sensor 7d. The steam temperature sensor 7b, the exhaust temperature sensor 7c, and the wastewater temperature sensor 7d are respectively arranged on outer surfaces of the steam evaporator 10, the exhaust evaporator 9, and the wastewater evaporator 8. The three-way valve in this case is a first three-way valve 13a, a second three-way valve 13b, and a third three-way valve 13c. The first three-way valve 13a, the second three-way valve 13b, and the third three-way valve 13c are respectively arranged at inlets of the exhaust evaporator 9, the steam evaporator 10, and the wastewater evaporator 8. The steam temperature sensor 7b, the exhaust temperature sensor 7c, and the wastewater temperature sensor 7d are respectively connected to the input end of the control system, and the output end of the control system is respectively connected to the first three-way valve 13a, the second three-way valve 13b, and the third three-way valve 13d. The control system is further configured to respectively control statuses of the second three-way valve 13b, the first three-way valve 13a, and the third three-way valve 13c according to a steam temperature detected by the steam temperature sensor 7b, an exhaust temperature detected by the exhaust temperature sensor 7c, and a wastewater temperature detected by the wastewater temperature sensor 7d.

Whether the steam evaporator 10, the exhaust evaporator 9, and the wastewater evaporator 8 are connected to a circulation system is determined by respective temperature sensors.

When the steam evaporator, the exhaust evaporator, and the wastewater evaporator are not connected to the circulation system, the first three-way valve 13a, the second three-way valve 13b, and the third three-way valve 13c are all closed (taking the first three-way valve 13a as an example to describe the closed state, the first three-way valve 13a is laterally conducted, a pipe between an inlet of the exhaust evaporator 9 and both the expansion valve 2 and the main evaporator 1 is not conducted, and the exhaust evaporator 9 is not connected to the circulation system).

When the steam evaporator 10, the exhaust evaporator 9, and the wastewater evaporator 8 need to be all connected to the circulation system, the exhaust evaporator 9, the steam evaporator 10, and the wastewater evaporator 8 are serially connected to the circulation system and then to the main evaporator 1 in sequence. This solution can ensure that an inlet temperature of the compressor does not change much, and an operating condition does not fluctuate because of recovery of shower heat.

In this case, the three waste heat recovery evaporators, namely, the steam evaporator 10, the exhaust evaporator 9, and the wastewater evaporator 8 recover sensible heat and latent heat in the bathroom.

When the shower starts, a large amount of water vapor is generated. The steam evaporator 10 recovers heat of the water vapor, and the water vapor is condensed and undergoes a phase change at the steam evaporator 10. Latent heat of the phase change is recovered by a refrigerant in the steam evaporator 10.

During the shower, a large amount of high-temperature wastewater is directly discharged, and a lot of heat is also taken away. A refrigerant in the wastewater evaporator 8 recovers waste heat of the hot shower water.

When a ventilating fan is turned on, gas in the bathroom takes away a lot of heat, and a refrigerant in the exhaust evaporator 9 recovers this part of heat.

In a preferred implementation, the HPWH in the present invention is in a high-temperature sterilization mode once a month for two hours. When the water heater is not used, that is, when hot water is not provided, the compressor starts cyclically and an internal temperature of the hot water heat exchanger 12 is controlled to 60° C. for at least two hours to kill Legionella in the high-temperature environment.

A working principle of the HPWH in the present invention is as follows: Based on a heat pump technology in the present invention, the main evaporator is placed in the cold-water tank to directly contact the working medium for heat exchange, and the condenser directly performs heat convection on tap water, so that the HPWH has a high heat exchange coefficient on both sides and a small temperature difference of the heat exchange. Compared with an air source HPWH, the HPWH has a small temperature difference between an evaporation temperature and a condensation temperature, and a COP is higher than that of the air source HPWH. In addition, because a temperature of the working medium in the cold-water tank is not affected by the external environment, a temperature fluctuation is small, and the water heater operates more stably. Regardless of the heat recovery of the three waste heat recovery evaporators, namely, the steam evaporator, the exhaust evaporator, and the wastewater evaporator, thermal calculation shows that under typical operating conditions in summer, a tap water temperature is 20° C., a leaving water temperature is 40° C., and a system COP is 4.26; under typical operating conditions in winter, a tap water temperature is 10° C., a leaving water temperature is 40° C., and a system COP is 3. The three evaporators recover waste heat of hot water and water vapor in the shower. In theory, 30% to 90% of the heat of the hot water in the shower can be recovered. The temperature of the water stored in the cold-water tank is always less than or equal to the ambient temperature. Therefore, heat is not dissipated to the ambient temperature and there is no energy loss. Instead, ambient heat is slowly absorbed and the water heater is more energy-saving.

This water heater can achieve instant heating with a low electric power. According to hot water flow, a tap water temperature, and a hot water temperature required by an adult during the shower, it may be learned through calculation that a heating power for instant heating is 3-6 kW. Therefore, the COP of the HPWH is 3 to 6, and it can be learned that the electric power is 2-0.5 kW. In this case, the water heater can operate to meet power supply conditions of most households without a need to separately access a circuit.

When the HPWH operates, a refrigerant in the main evaporator 1 absorbs the heat of the water in the cold-water tank 5, heats the tap water that exchanges heat with the condenser 3 through the hot water heat exchanger 12 using a heat pump cycle, and further mixes with the tap water through the mixing valve 6 to reach a shower temperature.

The mixing valve 6 controls hot and cold water flow and a ratio of hot water to cold water. When the mixing valve 6 is opened and hot water is required on the hot water side, the temperature sensor 7a detects whether the hot water temperature reaches a user-specified temperature. The specified temperature ranges from 35° C. to 60° C. This temperature varies with usage habits, and is preferably 38-45° C. When it is detected that a difference between the hot water temperature and the specified temperature is large, an operating frequency of the compressor increases. When the hot water temperature is close to the specified temperature, the frequency of the compressor is reduced. When the hot water temperature is the same as the specified temperature, the compressor operates at a rated speed. The operating frequency of the compressor is controlled according to the water temperature.

After the shower starts, when the steam temperature sensor 7b and the wastewater temperature sensor 7d detect a temperature rise, the three-way valves 13b and 13c are opened, and the steam evaporator 10 and the wastewater evaporator 8 are connected to a heat pump cycle. The three evaporators, namely, the main evaporator 1, the steam evaporator 10, and the wastewater evaporator 8 are connected in series. The main evaporator 1 absorbs heat of the working medium in the cold-water tank 5, the steam evaporator 10 absorbs heat of water vapor in the shower, and the wastewater evaporator 8 absorbs heat of hot wastewater in the shower.

When the ventilating fan is turned on, the exhaust temperature sensor 7c detects a temperature rise, the three-way valve 13a is opened, and the exhaust evaporator 9 is connected to the heat pump cycle. The exhaust evaporator 9, the steam evaporator 10, the wastewater evaporator 8, and the main evaporator 1 are serially connected to the cycle.

After the shower, the main evaporator 1 absorbs the heat of the working medium in the cold-water tank 5, so that the temperature of the working medium in the cold-water tank is lower than the ambient temperature. In this case, the working medium in the cold-water tank absorbs heat of the ambient temperature, and the temperature gradually rises until the temperature is close to or equal to the ambient temperature. The thermal insulation layer of the cold-water tank is determined by the heating process. The thermal insulation layer makes the temperature of the working medium in the cold-water tank rise from a low temperature to the ambient temperature in 10-20 hours, to reduce great impact of a huge temperature rise of the cold-water tank on a temperature in the bathroom. The impact is reduced through slow heating. The temperature of the working medium in the cold-water tank is always less than or equal to the ambient temperature, thereby avoiding an energy waste due to heat dissipation to the environment.

After the shower, the working medium in the cold-water tank absorbs energy from the environment, and the temperature slowly rises until the temperature is close to or equal to the ambient temperature. Heat absorbed by fluid during the heating process is:

$$Q_W = m_1 \gamma + c m_W (T_E - T_0) \tag{1}$$

In the equation, $m_1$ is mass of the working medium undergoing the phase change; $\gamma$ is the latent heat of the phase change of the working medium; c is specific heat of the working medium; mw is total mass of the working medium; $T_E$ is a temperature when the temperature rise of the working medium ends; and $T_0$ is a temperature when the temperature rise of the working medium starts.

An energy equation in the heating process is:

$$Q_w = \int_0^t AK \cdot \Delta(T_a - T_w) dt \tag{2}$$

$Q_W$ is heat absorbed in the heating process of the working medium in the cold-water tank, which can be obtained according to equation (1); A is an area of heat exchange between the working medium in the cold-water tank and the air; $T_a$ is the ambient temperature; $T_W$ is the temperature of the water in the water tank, which varies with time and is a time function; and t is a heating time of the water in the water tank.

K is a coefficient of the heat exchange between the working medium in the cold-water tank and the air, and is calculated according to a natural heat convection coefficient and a radiant heat exchange coefficient $K_1$ of the environment and an outer surface of the cold-water tank, a thermal conductivity $K_2$ of a wall surface of the cold-water tank and a natural heat convection coefficient $K_3$ of an inner wall surface of the cold-water tank and the working medium in the cold-water tank.

$$\frac{1}{K} = \frac{1}{K_1} + \frac{1}{K_2} + \frac{1}{K_3} \tag{3}$$

A thermal conductivity $K_2$ of a wall surface of the cold-water tank is calculated according to thermal conductivities of inner and outer wall surfaces and the thermal insulation layer:

$$\frac{1}{K_2} = \frac{\delta_1}{\lambda_1} + \frac{\delta_2}{\lambda_2} + \frac{\delta_3}{\lambda_3} \tag{4}$$

In the equation, $\delta_1$, $\delta_2$, $\delta_3$ are respectively thicknesses of the inner wall surface, the thermal insulation layer, and the outer wall surface of the cold-water tank; and $\lambda_1$, $\lambda_2$, $\lambda_3$ are respectively the thermal conductivities of the inner wall surface, the thermal insulation layer, and the outer wall surface of the cold-water tank.

According to equations (1-4), when all structural parameters are determined, physical parameters of materials are known and the ambient temperature is known. When a start temperature and an end temperature of the heating are known, the thickness of the thermal insulation layer of the cold-water tank and the heating time t are in a single-valued function relationship. To prevent the heating process from greatly affecting the ambient temperature of the bathroom and affecting comfort, the heating time is 10-20 hours and is preferably 10-18 hours, so that the thickness of the thermal insulation layer can be determined. To further reduce impact of the heating of the cold-water tank on the ambient temperature of the bathroom, the thermal insulation layer can be appropriately thickened according to an amount of the water in the cold-water tank.

The temperature sensors 7b to 7d detect that the temperature drops below the ambient temperature, and the three-way valves 13a, 13b, and 13c are closed to disconnect the steam evaporator 10, the exhaust evaporator 9, and the wastewater evaporator 8 from the heat pump cycle. After a next shower starts, when it is detected that the temperature rises, the relevant evaporators are connected again.

According to specific embodiments provided in the present invention, the present invention discloses the following technical effects.

The present invention provides a cold-storage instantaneous HPWH. The HPWH includes a cold-water tank, a main evaporator, a compressor, and a hot water heat exchanger. A condenser is arranged in the hot water heat exchanger. The main evaporator is arranged in the cold-water tank, and an outlet of the main evaporator is connected to an inlet of the condenser of the hot water heat exchanger through the compressor. An outlet of the condenser of the hot water heat exchanger is connected to the outlet of the main evaporator through a throttle. A water inlet of the hot water heat exchanger is connected to a water outlet of a tap water pipe, a water outlet of the hot water heat exchanger is connected to a first water inlet of a mixing valve, a second water inlet of the mixing valve is connected to the water outlet of the tap water pipe, and a water outlet of the mixing valve is connected to a shower head. The condenser performs heat convection heat on water in the hot water heat exchanger. In the present invention, heat of a working medium in the cold-water tank is absorbed by the main evaporator, and bathing water is rapidly heated by the hot water heat exchanger through heat exchange, thereby realizing instant heating and avoiding energy loss during hot water storage of an existing HPWH. In addition, the main evaporator absorbs the heat of the working medium in the cold-water tank, so that a temperature of the working medium in the cold-water tank is lower than an ambient temperature, and the working medium can absorb heat from the environment, to further improve energy utilization. Moreover, because the temperature of the working medium in the cold-water tank does not cause frosting due to impact of the outdoor environment, the cold-water tank is suitable for different seasons.

In the present invention, a toilet water tank is used as the cold-water tank for the following reasons. Reclaimed water used by the flush toilet every day contains a lot of low-quality heat and is cleaner than domestic sewage because there are no impurities, and utilization of the low-quality heat is simpler. In addition, a water temperature has little impact on use of the toilet, especially in summer, and toilet odor is reduced when a flushing temperature is low. Moreover, because the toilet water tank is used as the cold-water tank, the cold-water tank does not need to be separately arranged, thereby reducing a space occupied by a bathroom on the basis of reducing costs.

Furthermore, in the present invention, a steam evaporator, an exhaust evaporator, and a wastewater evaporator are further arranged to absorb waste heat generated during bathing and recover energy.

In the present invention, a thermal insulation layer is further arranged outside the cold-water tank to prevent the working medium in the cold-water tank from absorbing heat of the external environment too quickly and resulting in a rapid temperature drop of the external environment.

Each equivalent embodiment of the present specification is described in a progressive manner, each embodiment focuses on the difference from other embodiments, and the same and similar parts between the equivalent embodiments may refer to each other.

The principles and implementations of the present invention have been described with reference to specific examples. The description of the above embodiments is only for facilitating understanding of the method and the core idea of the present invention, and the described embodiments are only a part of the embodiments of the present invention. All other embodiments obtained by a person of ordinary skill in the art based on the embodiments of the present invention without departing from the inventive scope are the scope of the present invention.

What is claimed is:

1. A cold-storage instantaneous heat pump water heater (HPWH), wherein the heat pump water heater comprises a cold-water tank, a main evaporator, a compressor, and a hot water heat exchanger; and a condenser is arranged in the hot water heat exchanger;
    a working medium is filled in the cold-water tank, the main evaporator is arranged in the cold-water tank, and an outlet of the main evaporator is connected to an inlet of the condenser through the compressor; and an outlet of the condenser is connected to an inlet of the main evaporator through an expansion valve; and
    a water inlet of the hot water heat exchanger is connected to a water outlet of a tap water pipe, a water outlet of the hot water heat exchanger is connected to a first water inlet of a mixing valve, a second water inlet of the mixing valve is connected to the water outlet of the tap water pipe, and a water outlet of the mixing valve is connected to a shower head;
    wherein the HPWH further comprises a thermal insulation layer, and the thermal insulation layer is coated outside the cold-water tank; and a thickness of the thermal insulation layer is a thickness corresponding to a time interval of 10-20 hours in which the working medium in the cold-water tank rises from a temperature after bathing to an ambient temperature; the temperature of the water stored in the cold-water tank is always less than or equal to the ambient temperature;
    heat of a working medium in the cold-water tank is absorbed by the main evaporator, so that a temperature of the working medium in the cold-water tank is lower than an ambient temperature, and the working medium in the cold-water tank can slowly absorb heat from the environment;
    wherein the HPWH further comprises an auxiliary evaporator and a three-way valve;
    an inlet and a first outlet of the three-way valve are serially connected to a pipe between an outlet of the expansion valve and an inlet of the compressor, and a second outlet of the three-way valve is communicated with an inlet of the auxiliary evaporator; and
    an outlet of the auxiliary evaporator is communicated with a pipe between the first outlet of the three-way valve and the inlet of the compressor;
    wherein the auxiliary evaporator is one or more of a steam evaporator, an exhaust evaporator, and a wastewater evaporator; and
    the steam evaporator is disposed on a top of a bathroom, the exhaust evaporator is disposed on an air outlet of the bathroom, and the wastewater evaporator is disposed on a floor of a shower area in the bathroom.

2. The cold-storage instantaneous HPWH according to claim 1, wherein in a process in which the main evaporator absorbs heat in the cold-water tank, a phase change rate of the working medium in the cold-water tank is 20% to 60%.

3. The cold-storage instantaneous HPWH according to claim 1, wherein the cold-water tank is a toilet water tank, and a working medium in the toilet water tank is water.

4. The cold-storage instantaneous HPWH according to claim 3, wherein in a process in which the main evaporator absorbs heat in the toilet water tank, a phase change rate of the water in the toilet water tank is 20% to 50%.

5. The cold-storage instantaneous HPWH according to claim 1, wherein the HPWH further comprises a water temperature sensor and a control system; and
    the water temperature sensor is arranged in a water outlet pipe of the hot water heat exchanger, the water temperature sensor is connected to an input end of the control system, an output end of the control system is connected to a control end of the compressor, and the control system is configured to adjust a rotation speed of the compressor according to a water temperature in the water outlet pipe of the hot water heat exchanger measured by the water temperature sensor.

6. The cold-storage instantaneous HPWH according to claim 3, wherein the HPWH further comprises a water temperature sensor and a control system; and
    the water temperature sensor is arranged in a water outlet pipe of the hot water heat exchanger, the water temperature sensor is connected to an input end of the control system, an output end of the control system is connected to a control end of the compressor, and the control system is configured to adjust a rotation speed of the compressor according to a water temperature in the water outlet pipe of the hot water heat exchanger measured by the water temperature sensor.

7. The cold-storage instantaneous HPWH according to claim 6, wherein the HPWH further comprises an auxiliary evaporator and a three-way valve;
    an inlet and a first outlet of the three-way valve are serially connected to a pipe between an outlet of the expansion valve and an inlet of the compressor, and a second outlet of the three-way valve is communicated with an inlet of the auxiliary evaporator; and
    an outlet of the auxiliary evaporator is communicated with a pipe between the first outlet of the three-way valve and the inlet of the compressor.

8. The cold-storage instantaneous HPWH according to claim 1, wherein the HPWH further comprises an auxiliary temperature sensor;
    the auxiliary temperature sensor is arranged on an outer surface of the auxiliary evaporator, the auxiliary temperature sensor is connected to the control system, and the auxiliary temperature sensor is configured to detect an ambient temperature at a position of the auxiliary evaporator; and the control system is further configured to control a status of the three-way valve according to the ambient temperature at the position of the auxiliary evaporator.

9. The cold-storage instantaneous HPWH according to claim 7, wherein the HPWH further comprises an auxiliary temperature sensor;

the auxiliary temperature sensor is arranged on an outer surface of the auxiliary evaporator, the auxiliary temperature sensor is connected to the control system, and the auxiliary temperature sensor is configured to detect an ambient temperature at a position of the auxiliary evaporator; and the control system is further configured to control a status of the three-way valve according to the ambient temperature at the position of the auxiliary evaporator.

10. The cold-storage instantaneous HPWH according to claim 7, wherein the auxiliary evaporator is one or more of a steam evaporator, an exhaust evaporator, and a wastewater evaporator; and the steam evaporator is disposed on a top of a bathroom, the exhaust evaporator is disposed on an air outlet of the bathroom, and the wastewater evaporator is disposed on a floor of a shower area in the bathroom.

* * * * *